US008442206B2

(12) United States Patent
Khouri et al.

(10) Patent No.: US 8,442,206 B2
(45) Date of Patent: May 14, 2013

(54) METHOD OF RESPONDING TO AN INCOMING VOICE CALL

(75) Inventors: Joseph Khouri, San Jose, CA (US); Labhesh Patel, San Francisco, CA (US); Mukul Jain, San Jose, CA (US); Sanjeev Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1248 days.

(21) Appl. No.: 11/466,380

(22) Filed: Aug. 22, 2006

(65) Prior Publication Data

US 2008/0063181 A1 Mar. 13, 2008

(51) Int. Cl.
*H04M 3/00* (2006.01)

(52) U.S. Cl.
USPC ........... 379/251; 379/252; 379/253; 379/255; 379/256

(58) Field of Classification Search ............. 379/201.01, 379/211.02, 88.26; 455/567, 413
See application file for complete search history.

(56) References Cited

U.S. PATENT DOCUMENTS

| 5,029,198 | A  | * | 7/1991  | Walpole et al.    | 379/88.23 |
| 6,246,889 | B1 | * | 6/2001  | Boltz et al.      | 455/567   |
| 6,347,133 | B1 | * | 2/2002  | Galbreath         | 379/67.1  |
| 6,697,475 | B1 | * | 2/2004  | MeLampy et al.    | 379/201.12|
| 7,133,503 | B2 | * | 11/2006 | Revisky et al.    | 379/88.12 |
| 7,388,951 | B2 | * | 6/2008  | Moss et al.       | 379/207.02|
| 2001/0056496 | A1 | * | 12/2001 | Tam           | 709/230   |
| 2003/0123645 | A1 | * | 7/2003  | Comisky       | 379/399.01|
| 2003/0215078 | A1 | * | 11/2003 | Brahm et al.  | 379/211.02|
| 2006/0126806 | A1 | * | 6/2006  | Trandal et al.| 379/88.26 |
| 2006/0182248 | A1 | * | 8/2006  | Smith et al.  | 379/201.01|
| 2007/0092073 | A1 | * | 4/2007  | Olshansky et al.| 379/232 |
| 2007/0142026 | A1 | * | 6/2007  | Kuz et al.    | 455/404.1 |
| 2008/0037743 | A1 | * | 2/2008  | Bishop        | 379/201.01|

\* cited by examiner

*Primary Examiner* — Joseph J Nguyen

(74) *Attorney, Agent, or Firm* — Schwegman, Lundberg & Woessner, P.A.

(57) ABSTRACT

A system and method of responding to an incoming voice call are described. The method may comprise receiving the incoming call at a voice communication device, monitoring a user input via the voice communication device and generating a user control signal in response to the user input. The user control signal may identify that termination of ring functionality associated with the incoming call is at least to be delayed. Further, a system and method are described of processing a voice call to a voice communication device. The method may comprise communicating the voice call to a voice communication device and receiving from the voice communication device a user control signal in response to a user input. Termination of ring functionality may be at least delayed in response to the user control signal. The invention extends to a device to process a voice call to a voice communication device.

8 Claims, 5 Drawing Sheets

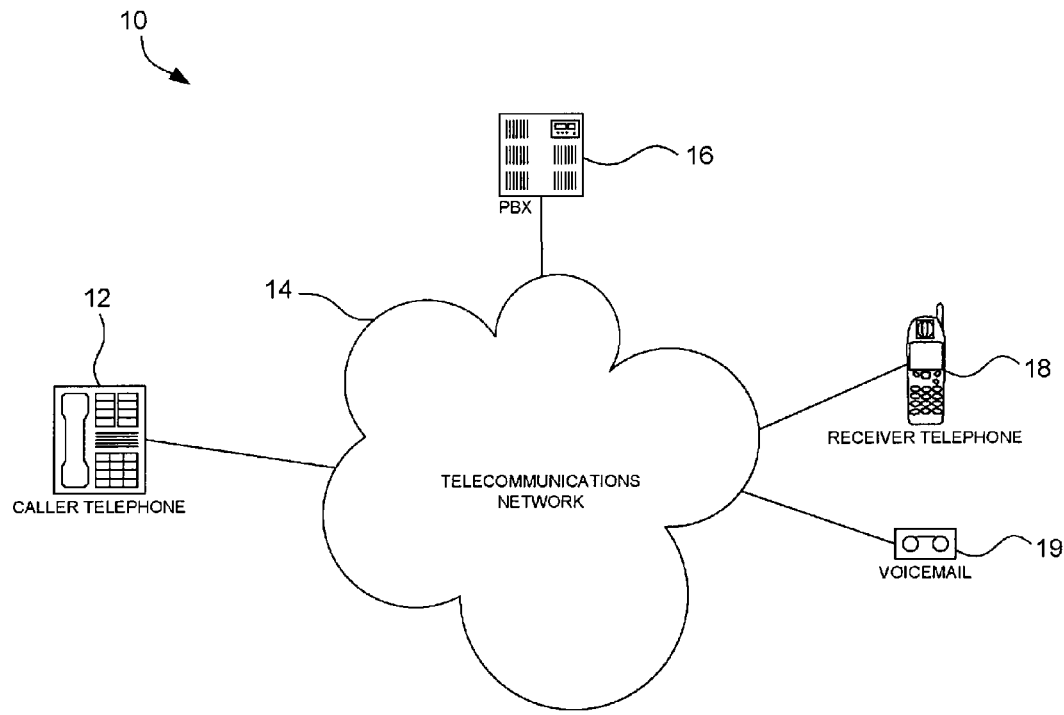
FIG 1
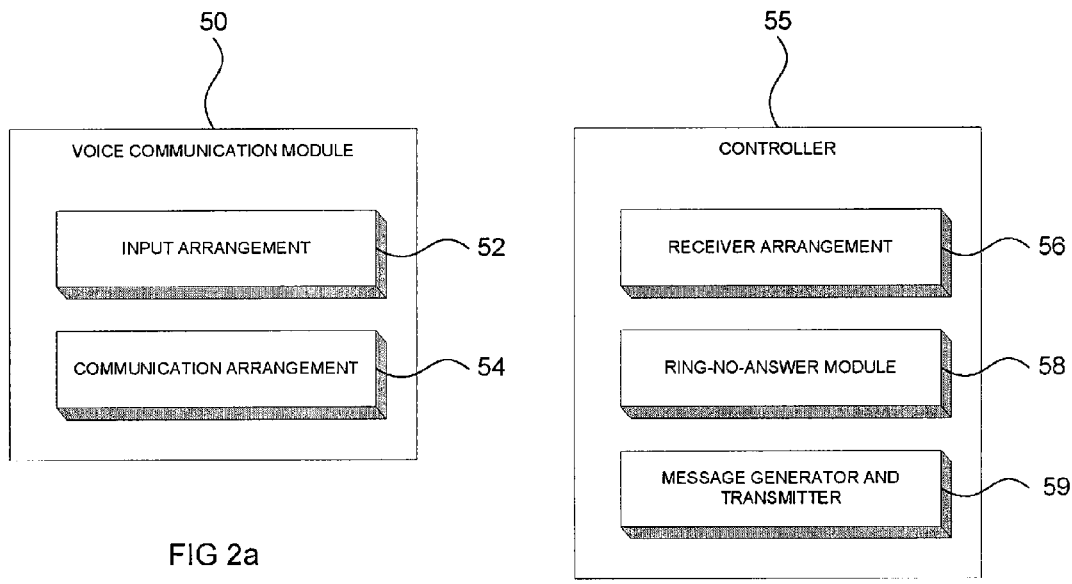
FIG 2a
FIG 2b

METHOD OF RESPONDING TO AN INCOMING VOICE CALL

FIELD

This application relates generally to telephony and in an example embodiment to a method of responding to an incoming voice call and to a method of processing a voice call.

BACKGROUND

Current telephone systems typically include a Ring-No-Answer timeout setting. In response to a time period or a number of rings elapsing without the telephone call being answered, an exchange re-routes the telephone call, for example to a voicemail system or another telephone number, or simply terminates the call. Some telephones also include such a Ring-No-Answer timeout setting on the telephone itself.

The Ring-No-Answer timeout setting on the telephone system, or the telephone itself, is presently only adjustable prior to a telephone call being received.

BRIEF DESCRIPTION OF DRAWINGS

The present invention is illustrated by way of example and not limitation in the figures of the accompanying drawings, in which like references indicate similar elements and in which:

FIG. 1 shows a schematic diagram showing a voice communication system in accordance with an example embodiment.

FIGS. 2a and 2c show schematic diagrams of voice communication devices in accordance with example embodiments.

FIG. 2b shows a high-level schematic diagram of a controller in accordance with an example embodiment.

DETAILED DESCRIPTION

Figure 2C:
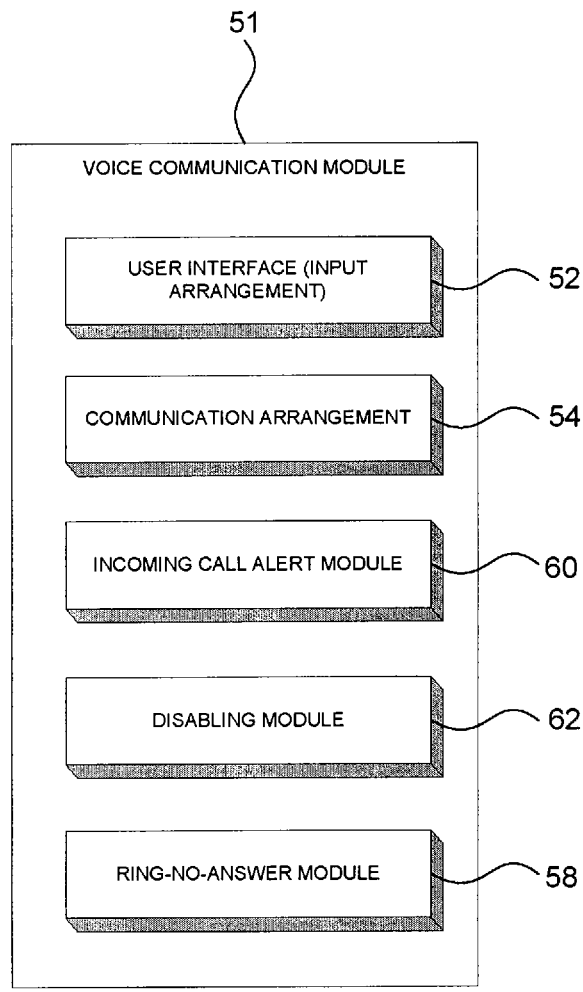

In the following description, for purposes of explanation, numerous specific details are set forth in order to provide a thorough understanding of embodiments of the present invention. It will be evident, however, to one skilled in the art that the present invention may be practiced without these specific details. In example embodiments, a method and a device are described to identify a user input to at least delay termination of ring functionality associated with an incoming call at a voice communication device. This functionality is described by way of example to Ring-No-Answer functionality.

Referring to FIG. 1, a voice communication system is generally indicated by reference numeral 10. The system 10 is operable to modify Ring-No-Answer functionality of a voice communication or telephone call, while the call is incoming. The system 10 includes a plurality of caller telephones 12 (only one of which is shown by way of example in FIG. 1). The caller telephone 12 may be any telephone from which a voice communication can be made, for example a landline telephone, a mobile telephone, a computer having a computer telephony interface, a Voice over Internet Protocol (VoIP) telephone, or the like.

The caller telephone 12 is in communication with a telecommunications network 14, which may be a cellular telephone network, a landline telephone network, a computer network, or any combination thereof. The telecommunications network 14 may include, at least partially, the Internet. The system 10 includes a controller (see FIG. 2b) which may be in the form of a telephone exchange (or call manager), indicated by reference numeral 16, which is in communication with the telecommunications network 14. In an example embodiment, the telephone exchange is a Private Branch Exchange (PBX) 16, however it is to be understood that the telephone exchange could be any component of a telephone system for routing or switching telephone calls, such as, for example, a PSTN (Public Switched Telephone Network). In an example embodiment, the PBX 16 is an IP (Internet Protocol) PBX.

The system 10 further includes a receiver or destination telephone 18. The receiver telephone 18 is shown by way of example to be a mobile telephone, such as a mobile IP telephone or a cellular telephone, or a telephone extension of the PBX 16, but may be any voice communication device, such as a landline telephone, a computer having a computer telephony interface, or the like. A voice communication includes a communication that may have a voice component as well as a video component (e.g. a video call). The system 10 may further include a voicemail system 19, which may be in the form of a domestic appliance (e.g. an answering machine) which is configured to answer a call automatically and route that call to a message recorder. In addition or instead, the voicemail system may however by any device or server arrangement capable of processing voice messages (e.g., a voicemail server arrangement of a mobile telephone service provider, a VoIP mailbox or the like.

The words Ring-No-Answer timeout are intended generally to include timeout criteria, for example elapsing of a pre-defined time period, for which the receiver telephone 18 is to ring before the incoming telephone or voice communication call is redirected or terminated. It is to be understood in this context that the term 'ringing telephone' indicates that the receiver telephone 18 is receiving an incoming call, and the term 'ring' indicates an alert on a telephone to indicate that the telephone call is incoming. The term ring is intended therefore to include audible alerts, tactile alerts, visual alerts, and the like.

An example time period for the Ring-No-Answer timeout may be 10 seconds, and in such a case, when the receiver telephone 18 rings for 10 seconds during which time it remains unanswered, the PBX 16 may be configured to redirect the incoming call to a voicemail system, forward the call to a different number, or the like. While it is usually the PBX 16 which includes a controller to manage the Ring-No-Answer timeout and redirect the incoming call, in certain circumstances the receiver telephone 18 itself may include a controller to manage the Ring-No-Answer timeout and redirect the incoming call. In an example embodiment, the voicemail system 19 (e.g. an answering machine) may include a controller which is configured to manage the Ring-No-Answer functionality and redirect the incoming call.

FIG. 2a shows a voice communication module 50 in accordance with an example embodiment. The voice communication module 50 may be provided in the receiver telephone 18 (such as a mobile telephone). It is to be understood that the voice communication module 50 may form part of any endpoint which is operable to receive an incoming telephone call.

The voice communication module 50 has an input arrangement 52, by means of which a user of the receiver telephone 18 may enter a user control to modify Ring-No-Answer functionality.

In an example embodiment, the input arrangement 52 of the communication module 50 may provide a user interface via which a user can enter a user control instruction to modify Ring-No-Answer functionality. In this context, modifying the Ring-No-Answer functionality may include extending the Ring-No-Answer timeout, (e.g. by increasing a Ring-No-Answer timeout value), and overriding the Ring-No-Answer timeout altogether (e.g. so that the receiver telephone 18 will ring indefinitely). The user control instruction may, for example, be referred to as a "Delay-Answer-Command". The input arrangement 52 may be in the form of a button on the voice communication module 50 (e.g. a physical button on a keypad or a soft button), or in the form of a microphone or the like operable to receive a voice command.

The voice communication module 50 further has a communication arrangement 54, which is operable to communicate or transmit a user control signal, generated in response to the user control instruction, to a Ring-No-Answer module of a controller 55 (see FIG. 2b). It is to be understood that the voice communication module 50 may include a set of machine executable instructions, for example a computer program, to control the operation of the voice communication module 50.

The controller 55 is shown to have a receiver arrangement 56 to receive the user control signal. The communication arrangement 54 (of the voice communication module 50) and a receiver arrangement 56 (of the controller 55) may respectively be in the form of network interface devices configured for communication across the telecommunications network 14. It is to be understood that in an example embodiment in which the voice communication module 50 and the controller 55 are integral with each other, the communication arrangement 54 and the receiver arrangement 56 may also be integral. An example integral embodiment may be a domestic answering machine.

The controller 55 further comprises a Ring-No-Answer module 58. The Ring-No-Answer module 58 may be a conceptual module which corresponds to a task performed by the controller 55. The controller 55 may therefore include a set of machine executable instructions, for example a computer program, to control the operation of the controller 55. The Ring-No-Answer module 58 is operable to modify its Ring-No-Answer functionality. The Ring-No-Answer module 58 may include a Ring-No-Answer timeout value (e.g. 10 seconds). In response to the receiver arrangement 56 receiving a Delay-Answer-Command (e.g., from the receiver telephone 18), the Ring-No-Answer module 58 may extend the Ring-No-Answer timeout value (e.g. from 10 seconds to 30 seconds), or may override the Ring-No-Answer timeout so that the controller 55 does not redirect or terminate the incoming telephone call no matter how long it remains unanswered.

In an example embodiment, the controller 55 is embodied in the PBX 16, and it is therefore the PBX 16 which controls the Ring-No-Answer functionality. It is to be understood that in another example embodiment, the Ring-No-Answer module 58 may be on the voice communication module 50 (see FIG. 2c). For example, the voice communication module 50 may be in the form of a receiver telephone 18 configured to route automatically incoming telephone calls to voicemail. Instead, the voice communication module 50 may be a voicemail system 19 (e.g. answering machine) connectable to a fixed line telephone.

In an example embodiment, a message indicating that the Delay-Answer-Command has been entered into the voice communication module 50 may be communicated to the caller telephone 12. In such a case, the PBX 16 (or other telephone exchange) may be configured to transmit the message to the caller telephone 12, so that the caller does not terminate the telephone call because he/she is tired of waiting. The controller 55 may therefore include a message generator and transmitter 59, for example in the form of the network interface device.

Activation of the Delay-Answer-Command on the voice receiver telephone 18 may be transmitted to the caller telephone 12 by the PBX 16 (e.g. using the message generator and transmitter 59). The PBX 16 may answer the telephone call from the caller telephone 12, and play a recorded message which states that a Delay-Answer-Command has been activated on the receiver telephone 18, and that the telephone call will therefore be answered in a short while. Instead, the PBX 16 may communicate with the caller telephone 12 without answering the telephone call, for example by transmitting a unique DTMF (Dual Tone Multi-Frequency) tone to the caller telephone 12, the caller thereby not having to incur the cost of being put on hold. Such functionality may be deployed in call centre equipment.

FIG. 2c shows an example voice communication device 51 (e.g., a cellular telephone) in more detail. The voice communication device 51 is shown to further include an incoming call alert module 60 to generate an alert (e.g. audible ring, vibrating alert or the like) in response to an incoming call. The voice communication device 51 further includes a disabling module 62 to disable the audible alert in response to the user control signal being generated. In this example embodiment, the voice communication device 51 includes the Ring-No-Answer module 58.

Figure 3A:
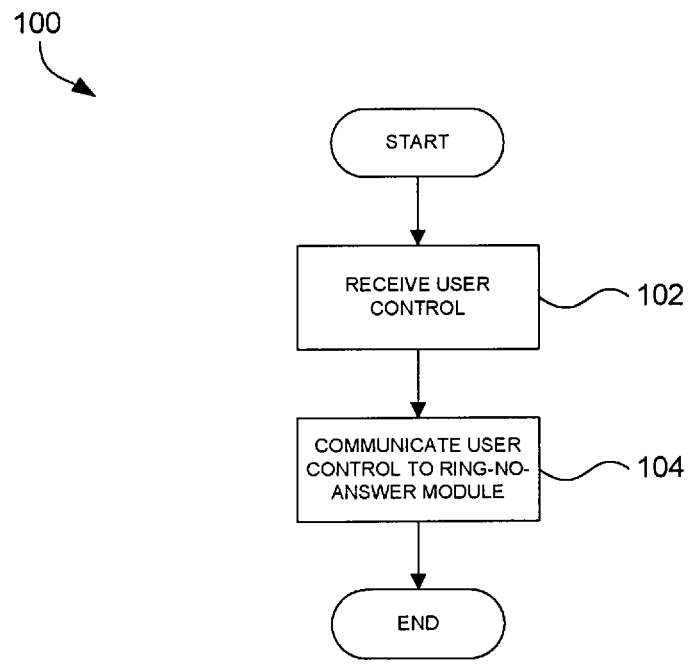
FIGS. 3a and 3b show high-level flow charts of methods, in accordance with example embodiments, to process incoming calls.

Referring now to FIG. 3a, a method 100, in accordance with an example embodiment, to process an incoming voice communication is shown. The flow chart showing the method 100 is a high-level flow chart shown from the side of the receiver telephone 18. The callee (the person who uses the receiver telephone 18 including the voice communication module 50), if he/she wishes to extend the Ring-No-Answer timeout, enters a user control instruction via the receiver telephone 18 to activate the Delay-Answer-Command, (see block 102). The receiver telephone 18 sends, at block 104, a user control signal (e.g. the Delay-Answer-Command) to the Ring-No-Answer module 58 on the controller 55.

Figure 3B:
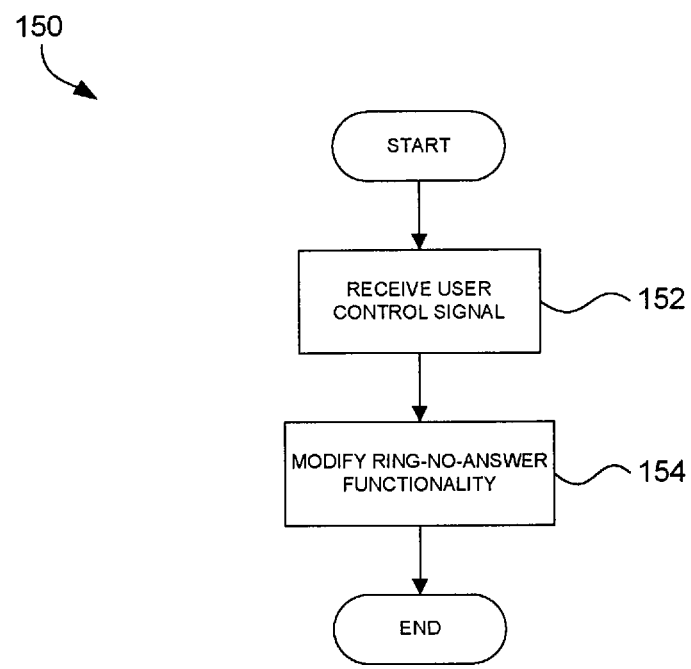

FIG. 3b shows a flow chart of a method 150 in accordance with an example embodiment. The flow chart is a high-level flow chart shown from the side of the controller 55. The controller 55 receives, at block 152, the user control signal (e.g. the Delay-Answer-Command) from the receiver telephone 18. The Ring-No-Answer module 58 then modifies, at block 154, the Ring-No-Answer functionality.

Figure 3C:
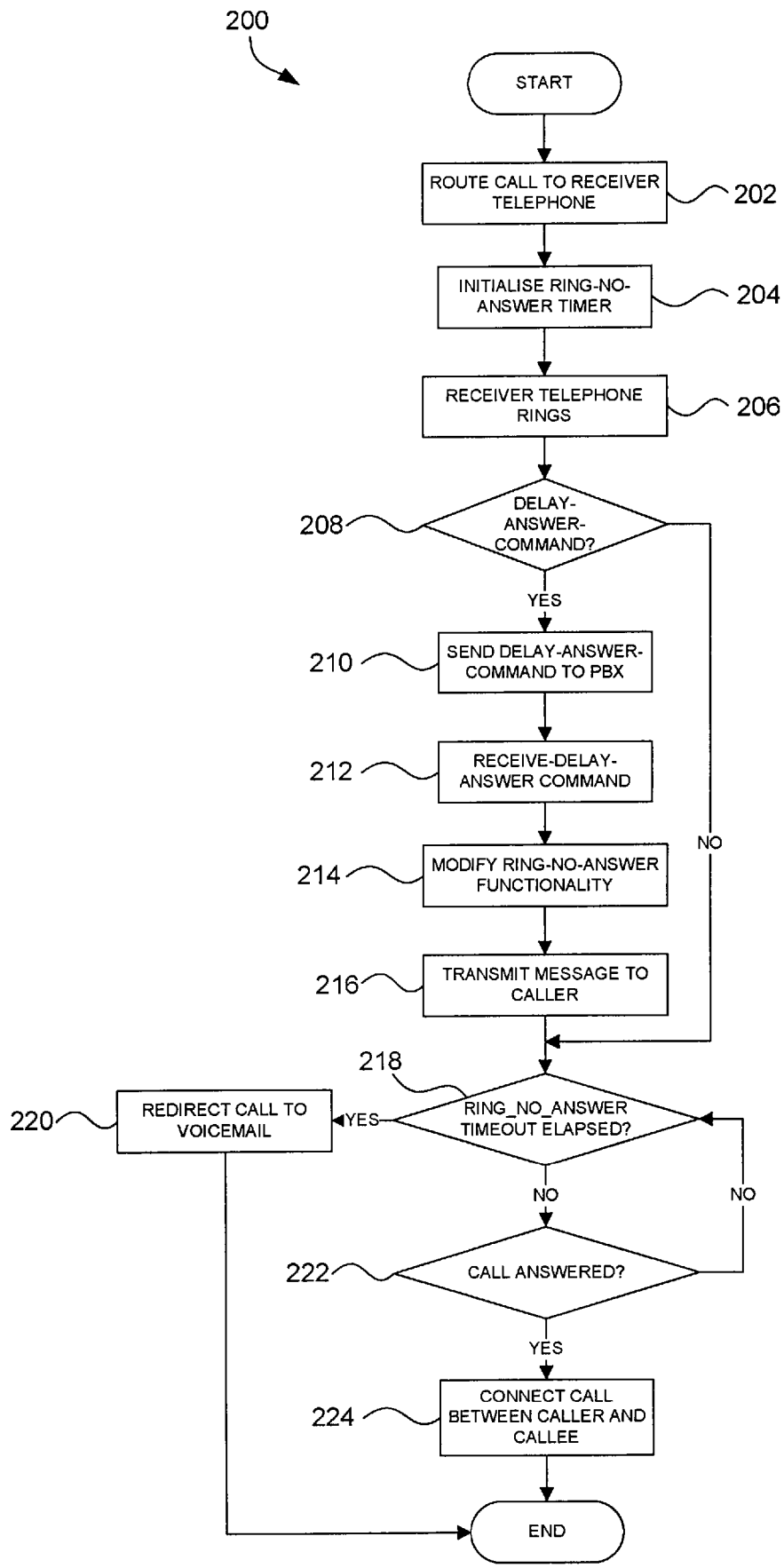
FIG. 3c shows a low-level flow chart of a further method in accordance with an example embodiment.

Referring now the FIG. 3c, a low-level flow chart of a method 200 in accordance with an example embodiment is shown. A caller initiates a telephone call from the caller telephone 12 to the receiver telephone 18 (e.g., a voice communication device. The telephone call is routed, at block 202, in a conventional manner via the telecommunications network 14 and the PBX 16 to the receiver telephone 18 (e.g., including the voice communication module 50). At the same time, the PBX 16 (which in this example embodiment includes the controller 55) may then initialize, at block 204, a Ring-No-Answer timer (e.g. for 10 seconds) which begins counting down.

The receiver telephone 18 is shown to ring, at block 206. The callee hears the receiver telephone 18 ring, but may be unable or unwilling immediately to answer the call. This may be the case if the callee is in a meeting or is driving, and the callee may thus choose to activate, at block 208, the delayed answer functionality, for example, by entering a user control into the voice communication module 50 of the receiver telephone 18 to activate the Delay-Answer-Command. As mentioned above, the Delay-Answer-Command may be activated via a user interface. The callee may activate the Delay-Answer-Command by pressing a button (e.g. a physical button or a soft button) on the receiver telephone 18. The button may be labelled "extend duration of ringing" or the like, by displaying the label on a display screen (if present) of the receiver telephone 18 adjacent the button. Instead, or in addition, the callee may issue a voice command recognisable by the receiver telephone 18 to activate the Delay-Answer-Command.

If the Delay-Answer-Command is not activated by the callee, the Ring-No-Answer timeout is not delayed, and the telephone call progresses in conventional fashion. If, however, the Delay-Answer-Command is activated by the callee, the receiver telephone 18, at block 210, the Delay-Answer-Command to the controller 55 of the PBX 16. The controller 55, in turn, receives, at block 212, the Delay-Answer-Command, and in response thereto, the Ring-No-Answer module 58 modifies, at block 214, the Ring-No-Answer functionality. Depending on the configuration of the PBX 16, the Ring-No-Answer module 58 may merely increase the Ring-No-Answer timer to a greater, pre-determined maximum value, (e.g. from 10 seconds to 30 seconds), or may override the Ring-No-Answer timer altogether, so that the receiver telephone 18 device will ring "indefinitely". Depending on the configuration of the receiver telephone 18, the Ring-No-Answer timeout value on the voice communication device 51 itself, if present, is also modified (in which case the voice communication device 51 may also include a Ring-No-Answer module 58). The disabling module 62 may mute or suppress audible ringing of the voice receiver telephone 18, which is useful if, for example, the callee is in a meeting.

In the example embodiment in which the controller 55 is on the voicemail system 19 which is either integral with, or a stand-alone unit connectable to, a telephone, the Ring-No-Answer module 58 of the voicemail system 19 may modify the Ring-No-Answer functionality accordingly upon activation of the Delay-Answer-Command.

In an example embodiment, a message may then be transmitted (e.g. by the message generator and transmitter 59), at block 216, to the caller telephone 12 indicating that the Delay-Answer-Command has been activated, that the callee intends answering the call shortly. In an example embodiment, the PBX 16 transmits a particular DTMF tone to the caller telephone 12, which the caller telephone 12 interprets, for example by sounding a tone similar to but distinguishable from an engaged tone to advise that the call will be answered in due course. Accordingly, unlike a conventional system where the call is answered and the caller is placed on hold, ringing continues and the caller is thus saved the cost of holding on the line (e.g., for a call centre agent).

The Ring-No-Answer timer is checked, at block 218, to see if the Ring-No-Answer timeout has elapsed (either the initial Ring-No-Answer timeout value, if the Delay-Answer-Command was not issued; or the increased Ring-No-Answer timeout value, if the Delay-Answer-Command was issued). If the Ring-No-Answer functionality was overridden or disabled, the Ring-No-Answer timeout may never elapse. If the Ring-No-Answer timeout elapses, the PBX 16 may redirect, at block 220, the telephone call to a pre-defined voicemail number (or the call may simply be terminated).

Alternatively, if the Ring-No-Answer timeout has not elapsed or is disabled, the receiver telephone 18 may continues to ring, at block 222, until the callee answers the call. When the callee answers, the PBX 16 connects, at block 224, the call between the caller and the callee.

Figure 4:
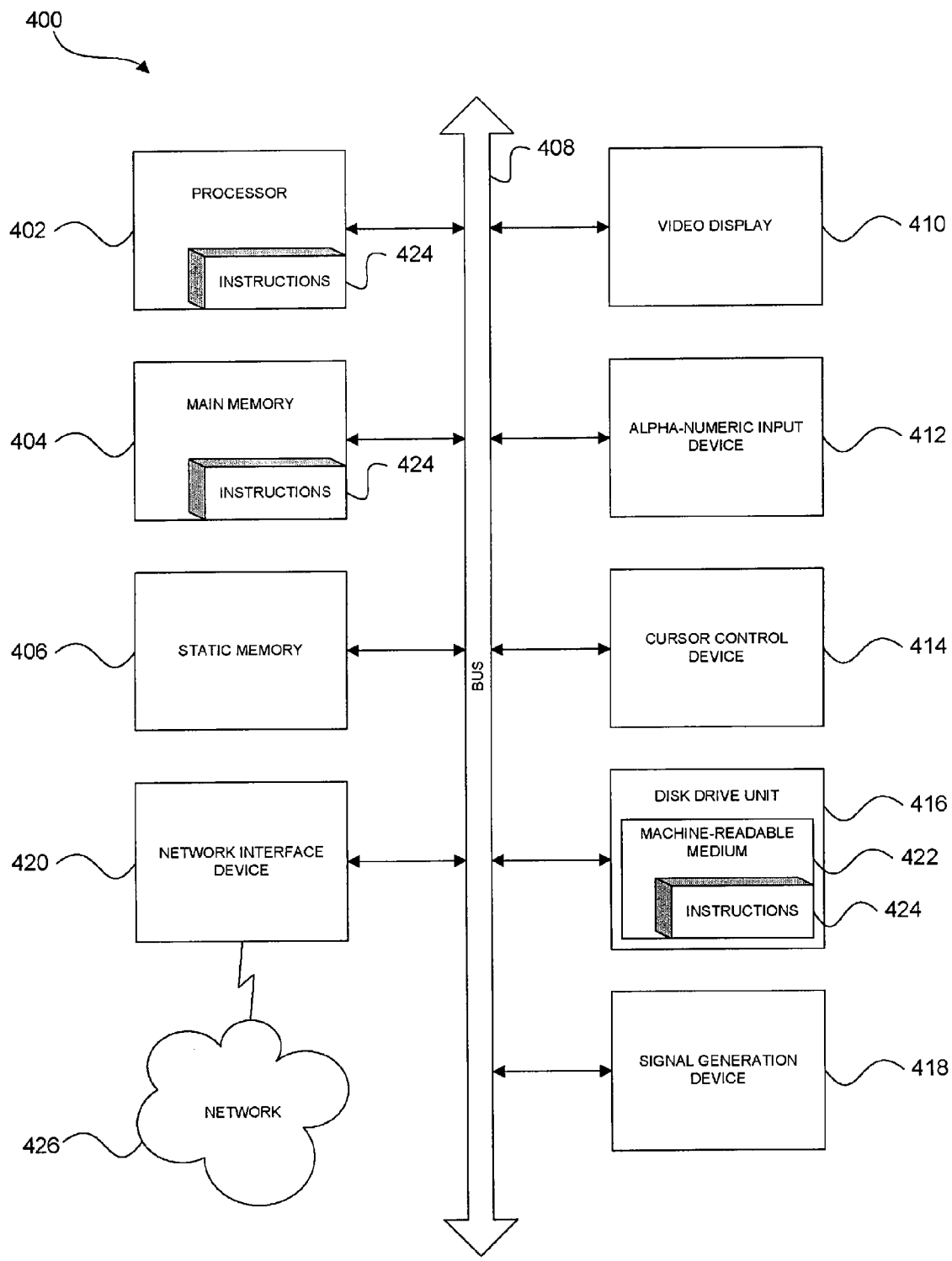
FIG. 4 shows a diagrammatic representation of equipment in the example form of a telephone exchange within which a set of instructions, for causing the equipment to perform any one or more of the methodologies discussed herein, may be executed.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a VoIP phone, a PSTN phone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The voice communication modules 50, 51 (e.g. included in the receiver telephone 18 or the voicemail system 19) and/or the controller 55 (e.g. the PBX 16) may comprise one or more components of the computer system 400.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of responding to an incoming voice call, the method comprising:
   receiving the incoming call at a voice communication device;
   presenting via a user interface of the voice communication device options to:
      answer the incoming call;
      increase a ring-no-answer timeout value, the expiration of which causes the incoming call to be routed to voicemail;
      override the ring-no-answer timeout value causing the voice communication device to continue providing an incoming call alert until the incoming call is either answered or the call is abandoned by a caller; and
      direct the incoming call to voicemail;
   monitoring a user input with regard to the presented options via the voice communication device while the incoming call is being received and prior to the incoming call being answered;
   generating a user control signal in response to the user input received while the incoming call is being received and prior to the incoming call being answered, the user control signal identifying that termination of ring functionality associated with the incoming call is at least to be delayed and without the incoming call being answered on the voice communication device, a message is to be transmitted to a caller device initiating the incoming call identifying that answering of the incoming call has at least been delayed, the message to be transmitted to the caller device being a Dual Tone Multi-Frequency tone; and
   wherein identifying that termination of ring functionality associated with the incoming call is to at least be delayed comprises communicating the user control signal to a Ring-No-Answer module to modify operation of the Ring-No-Answer module by overriding a Ring-No-Answer timeout period so that the ring functionality is not terminated regardless of how long the call remains unanswered.

2. The method of claim 1, which comprises suppressing an audible ringing of the voice communication device receiving the incoming voice call in response to the user input.

3. The method of claim 1, which comprises communicating the user control signal to a Ring-No-Answer module provided at one of a PBX or voicemail system.

4. A non-transitory computer-readable medium embodying instructions which, when executed by a voice communication device, cause the device to:
   receive an incoming call at the voice communication device;
   present via a user interface of the voice communication device options to:
      answer the incoming call;
      increase a ring-no-answer timeout value, the expiration of which causes the incoming call to be routed to voicemail;
      override the ring-no-answer timeout value causing the voice communication device to continue providing an incoming call alert until the incoming call is either answered or the call is abandoned by a caller; and
      direct the incoming call to voicemail;
   monitor a user input with regard to the presented option via the voice communication device while the incoming call is being received and prior to the incoming call being answered;
   generate a user control signal in response to the user input received while the incoming call is being received and prior to the incoming call being answered, the user control signal identifying that termination of ring functionality associated with the incoming call is at least to be delayed and without the incoming call being answered, a message is to be transmitted to a caller device initiating the incoming call identifying that answering of the incoming call has at least been delayed, the message to be transmitted to the caller device being a Dual Tone Multi-Frequency tone; and
   wherein identifying that termination of ring functionality associated with the incoming call is to at least be delayed comprises communicating the user control signal to a Ring-No-Answer module to modify operation of the Ring-No-Answer module by overriding a Ring-No-Answer timeout period so that the ring functionality is not terminated regardless of how long the call remains unanswered.

5. A voice communication device, which comprises:
   a receiver to an incoming call;
   a user interface arrangement to present options to:
      answer the incoming call;
      increase a ring-no-answer timeout value, the expiration of which causes the incoming call to be routed to voicemail;
      override the ring-no-answer timeout value causing the voice communication device to continue providing an incoming call alert until the incoming call is either answered or the call is abandoned by a caller; and
      direct the incoming call to voicemail;
   an input arrangement to monitor a user input with regard to the presented options while the incoming call is being received and prior to the incoming call being answered; and
   a processor to generate a user control signal in response to the user input received while the incoming call is being received and prior to the incoming call being answered, the user control signal identifying that termination of ring functionality associated with the incoming call is at least to be delayed and without the incoming call being answered, a message is to be transmitted to a caller device initiating the incoming call identifying that answering of the incoming call has at least been delayed, the message to be transmitted to the caller device being a Dual Tone Multi-Frequency tone; and
   a transmitter to communicate the user control signal to a Ring-No-Answer module to modify operation of the Ring-No-Answer module thereby to identify that termination of ring functionality associated with the incoming call is at least to be delayed.

6. The device of claim 5, wherein an audible ringing of the voice communication device receiving the incoming voice call is suppressed in response to the user input.

7. The device of claim 5, in which the device is configured to communicate the user control signal to a Ring-No-Answer module provided at one of a PBX or voicemail system.

8. A voice communication device, which comprises:
   means for receiving the incoming call at the voice communication device;
   means for presenting options to:
      answer the incoming call;
      increase a ring-no-answer timeout value, the expiration of which causes the incoming call to be routed to voicemail;
      override the ring-no-answer timeout value causing the voice communication device to continue providing an incoming call alert until the incoming call is either answered or the call is abandoned by a caller; and
      direct the incoming call to voicemail;
   means for monitoring a user input with regard to the presented options via the voice communication device while the incoming call is being received and prior to the incoming call being answered;
   means for generating a user control signal in response to the user input received while the incoming call is being received and prior to the incoming call being answered, the user control signal identifying that termination of ring functionality associated with the incoming call is at least to be delayed and without the incoming call being answered, a message is to be transmitted to a caller device initiating the incoming call identifying that answering of the incoming call has at least been delayed, the message to be transmitted to the caller device being a Dual Tone Multi-Frequency tone; and
   transmitter means for communicating the user control signal to a Ring-No-Answer module to modify operation of the Ring-No-Answer module thereby to identify that termination of ring functionality associated with the incoming call is at least to be delayed.

* * * * *